United States Patent
Lopez Mendez et al.

(10) Patent No.: US 11,652,878 B2
(45) Date of Patent: May 16, 2023

(54) EXTENDED-REALITY SYSTEM AND METHOD

(71) Applicants: Arm Limited, Cambridge (GB); Apical Limited, Cambridge (GB)

(72) Inventors: Roberto Lopez Mendez, Cambridge (GB); Daren Croxford, Swaffham Prior (GB); Laura Johanna Lähteenmäki, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/106,932

(22) Filed: Nov. 30, 2020

(65) Prior Publication Data
US 2022/0174111 A1   Jun. 2, 2022

(51) Int. Cl.
| | | |
|---|---|---|
| *G06F 15/177* | (2006.01) | |
| *H04L 67/1074* | (2022.01) | |
| *G06T 1/60* | (2006.01) | |
| *G06T 7/70* | (2017.01) | |
| *H04L 67/568* | (2022.01) | |

(52) U.S. Cl.
CPC ........... *H04L 67/1074* (2013.01); *G06T 1/60* (2013.01); *G06T 7/70* (2017.01); *H04L 67/568* (2022.05)

(58) Field of Classification Search
CPC ... H04L 67/1074; H04L 67/2842; G06T 7/70; G06T 1/60
USPC ......................................................... 709/220
See application file for complete search history.

(56) References Cited

U.S. PATENT DOCUMENTS

| | | | | |
|---|---|---|---|---|
| 7,696,992 B2* | 4/2010 | Gyorfi | ...................... | A63F 13/70 370/352 |
| 7,973,786 B2* | 7/2011 | Gyorfi | ...................... | A63F 13/12 715/848 |
| 8,224,868 B2* | 7/2012 | Conway | ................ | H04L 67/104 707/803 |
| 8,233,489 B2* | 7/2012 | Welin | ...................... | H04L 45/70 370/395.5 |
| 8,463,788 B2* | 6/2013 | Bandyopadhyay | .......................... | H04L 67/1008 707/827 |
| 9,551,873 B2* | 1/2017 | Zalewski | ............. | G02B 27/017 |
| 9,560,076 B2* | 1/2017 | Schultz | ................... | H04L 63/20 |
| 9,606,363 B2* | 3/2017 | Zalewski | ................ | G06F 3/011 |
| 9,685,050 B2* | 6/2017 | Kozloski | .................. | G08B 7/06 |
| 9,749,780 B2* | 8/2017 | Huang | .................. | G01S 5/0264 |

(Continued)

OTHER PUBLICATIONS

Use network service discovery', Android Developers, Nov. 30, 2020.

(Continued)

*Primary Examiner* — Alicia Baturay
(74) *Attorney, Agent, or Firm* — EIP US LLP

(57) ABSTRACT

An extended-reality system is described which determines extended-reality data to be obtained from the remote network-connected storage based on a location of the extended-reality system. The extended-reality system determines a communication method by which to obtain the extended-reality data, wherein the extended-reality data may be obtained by one or more requests to the remote network-connected storage or by one or more requests to a local device outside of the extended-reality system. A request is sent to at least one of the local device via a peer-to-peer network and the remote network-connected storage in dependence upon the determination by the extended-reality system.

18 Claims, 6 Drawing Sheets

(56) References Cited

U.S. PATENT DOCUMENTS

| | | | | |
|---|---|---|---|---|
| 9,824,548 | B2* | 11/2017 | Kozloski | H04M 1/724 |
| 9,990,689 | B2* | 6/2018 | Lashkari | G02B 27/0172 |
| 10,114,835 | B2* | 10/2018 | Malhotra | G06F 16/196 |
| 10,186,065 | B2* | 1/2019 | Anderson | G06V 20/56 |
| 10,681,562 | B1* | 6/2020 | Ertimo | H04W 16/18 |
| 10,698,879 | B1* | 6/2020 | Todd | H04L 67/1097 |
| 10,724,874 | B2* | 7/2020 | Beaurepaire | G01C 21/3667 |
| 10,797,930 | B1* | 10/2020 | Vihriala | H04L 1/0047 |
| 10,848,597 | B1* | 11/2020 | Ruistola | H04L 65/80 |
| 10,869,220 | B2* | 12/2020 | Sudarsan | H04W 28/0289 |
| 10,911,557 | B2* | 2/2021 | Hegde | H04L 67/141 |
| 11,164,386 | B2* | 11/2021 | Lopez Mendez | G06T 19/006 |
| 2011/0161875 | A1* | 6/2011 | Kankainen | G06F 3/0481 |
| | | | | 715/810 |
| 2020/0389515 | A1* | 12/2020 | Han | H04W 4/24 |
| 2021/0025717 | A1* | 1/2021 | Mendez | G06T 7/73 |
| 2021/0258376 | A1* | 8/2021 | Croxford | H04L 67/1089 |

OTHER PUBLICATIONS

Qualcomm Snapdragon 845 Mobile Platform', https://www.qualcomm.com/products/snapdragon-845-mobile-platform, Nov. 12, 2020.
Solis et al., '802.11ad Will Vastly Enhance Wi-Fi, The Importance of the 60 GHz Band to Wi-Fi's Continued Evolution', ABI Research, Apr. 1, 2016.
Hetting, Claus, 'WiGig (802.11ad): On the brink of a breakthrough in 2017', Aug. 5, 2017.
HTTP caching', MDN web Docs, Nov. 29, 2020.
Connect Devices Wirelessly', Android Developers, Dec. 27, 2019.
WiGig', Wikipedia, Nov. 19, 2020.
Balani, Rahul, 'Energy Consumption Analysis for Bluetooth, WiFi and Cellular Networks', University of California at Los Angeles, Tech. Rep. TR-UCLA-NESL-200712-01, Dec. 1, 2007.
Sun et al., 'ModelingWiFi Active Power/Energy Consumption in Smartphones', Department of Computer Science and Engineering, University at Buffalo, SUNY, Buffalo, NY, 14260-2500, Jun. 30, 2014.

* cited by examiner

EXTENDED-REALITY SYSTEM AND METHOD

BACKGROUND OF THE INVENTION

Field of the Invention

The present invention relates to an extended-reality system and a method.

Description of the Related Technology

Extended reality is an umbrella term covering a full range of user experience from partial sensory inputs to immersive virtual reality and includes forms such as augmented reality (AR), mixed reality (MR) and virtual reality (VR). Extended Reality (XR) is becoming more and more widely used, with applications ranging from navigation purposes to gaming XR data is being used to provide information about physical locations and objects, and with the development of increasingly powerful mobile devices, is being used with increasing frequency in mobile applications in public environments.

XR data is highly dynamic in nature; it is updated near-constantly and is likely to change frequently. Furthermore, many devices may wish to access the same XR data in order to have the same experience in a location. XR data may be large and include frequently updated information such as high-resolution video and sound assets. Caching data about locations and objects on a device in advance is therefore not practical and XR devices must frequently retrieve information from a cloud-based storage in near real-time. This retrieval is likely to be carried out via mobile telecommunication network connections, given the mobile nature of XR devices. However, given the volume of data that must be retrieved, retrieving the XR data from cloud-based storage tends to consume a significant amount of bandwidth. Additionally, the data transfer is likely to consume a significant amount of power from the device, even where mobile connectivity is good.

A method and system to reduce power consumption to the device, as well as reducing mobile network congestion and latency, is therefore desirable.

SUMMARY

According to a first aspect there is provided an extended-reality system for providing information to a user, the system comprising a data determining unit configured to determine extended-reality data to be obtained based on a location of the extended-reality system; a communication method determining unit configured to determine a communication method for obtaining the extended-reality data, wherein the extended-reality data may be obtained by one or more requests to the remote network-connected storage or by one or more requests to a local device outside of the extended-reality system via a peer-to-peer network, which local device has previously obtained the extended-reality data from the remote network-connected storage; and a communication unit configured to send a request to at least one of the local device via the peer-to-peer network and the remote network-connected storage in dependence upon the determination by the communication method determining unit.

According to a second aspect there is provided a method for obtaining extended-reality data for an extended-reality system, the method comprising: determining extended-reality data to be obtained based on a location of the extended-reality system; determining a communication method for obtaining the extended-reality data, wherein the extended reality data may be obtained by one or more requests to the remote network-connected storage or by one or more requests to a local device outside of the extended-reality system via a peer-to-peer network, which local device has previously obtained the extended-reality data from the remote network-connected storage; and sending a request to at least one of the local device via the peer-to-peer network and the remote network-connected storage in dependence upon the determined communication method.

According to a third aspect there is provided a non-transitory computer-readable storage medium storing instructions that, when executed by an extended-reality system, cause the extended-reality system to perform a method comprising: determining extended-reality data to be obtained based on a location of the extended-reality system; determining a communication method for obtaining the extended-reality data, wherein the extended reality data may be obtained by one or more requests to the remote network-connected storage or by one or more requests to a local device outside of the extended-reality system via a peer-to-peer network, which local device has previously obtained the extended-reality data from the remote network-connected storage; and sending a request to at least one of the local device via the peer-to-peer network and the remote network-connected storage in dependence upon the determined communication method.

BRIEF DESCRIPTION OF THE DRAWINGS

Embodiments will now be described with reference to the accompanying drawings in which.

DETAILED DESCRIPTION OF CERTAIN INVENTIVE EMBODIMENTS

Figure 1:
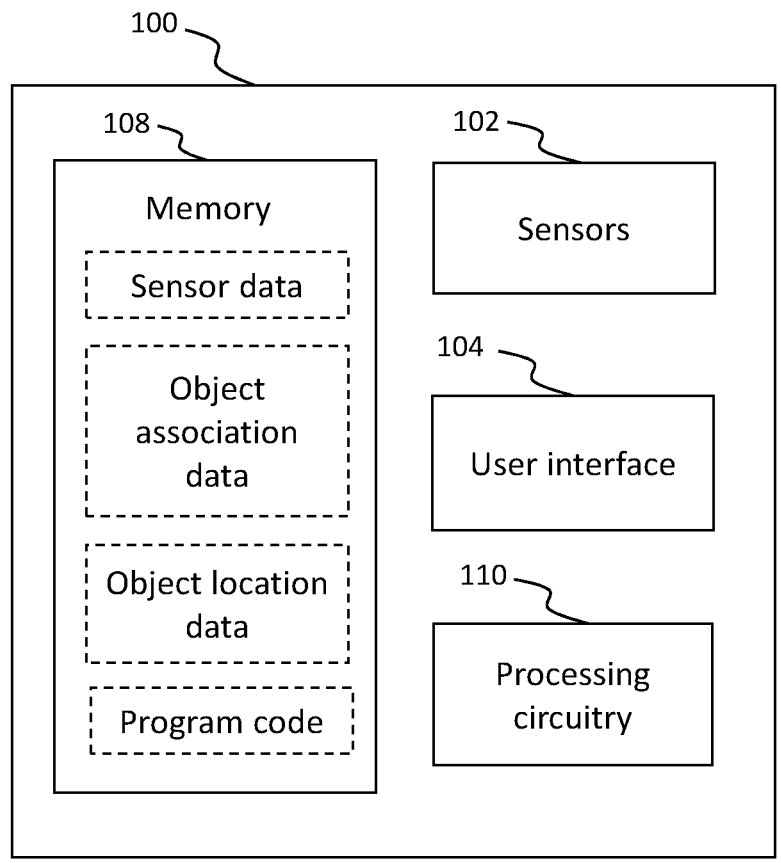
FIG. 1 is a schematic diagram showing components of an XR system.

Before discussing particular embodiments with reference to the accompanying figures, the following description of embodiments is provided.

In a first embodiment there is provided an extended-reality system for providing information to a user, the system comprising: a data determining unit configured to determine extended-reality data to be obtained based on a location of the extended-reality system; a communication method determining unit configured to determine a communication method for obtaining the extended-reality data, wherein the extended-reality data may be obtained by one or more requests to the remote network-connected storage or by one or more requests to a local device outside of the extended-reality system via a peer-to-peer network, which local device has previously obtained the extended-reality data from the remote network-connected storage; and a communication unit configured to send a request to at least one of the local device via the peer-to-peer network and the remote network-connected storage in dependence upon the determination by the communication method determining unit.

The extended-reality system may be connected to the remote network-connected storage via a wireless network. In some embodiments, the extended-reality system may be connected to the remote network-connected storage via a mobile telecommunication network.

The remote network-connected storage may be a cloud service, for example a cloud network, a cloud server, a cloud computing system or a data storage connected to the internet.

The extended-reality system may comprise a storage. A portion of the storage may be allocated as a cache for extended-reality data. The extended reality data stored in the cache may be provided to one or more local devices participating in the peer-to-peer network.

The extended-reality data may include information relating to the location of the user, for example regarding objects or locations identified in a surrounding environment local to the extended reality system. The extended reality data may include at least one of: sound data, image data, video data, 3D geometry models, and/or application data that may be useful to the user in a given location.

The extended-reality system may determine the location of the user by using at least one of: a satellite navigation system or cellular network triangulation.

The extended-reality system may further comprise a camera for capturing images and a processor, wherein the processor is configured to process image data from the camera in order to determine a location of the extended reality system. The extended-reality system may be configured to perform Simultaneous Location and Mapping (SLAM) techniques.

The extended-reality system may further comprise a Network Service Discovery service configured to identify devices on the peer-to-peer network that can provide or access the extended-reality data determined by the data determining unit.

The extended-reality system may be configured to send a request to the local device including a request to access a network connection of the local device in order to obtain the extended-reality data. The extended-reality system may be configured to receive a request from a requesting device to access a network connection of the extended-reality system in order to obtain requested extended reality data.

The extended-reality data stored in the storage may include a data field indicating a time at which the data needs to be refreshed from the remote network-connected storage. The extended-reality data may include a digital signature from the remote network-connected storage to allow the extended-reality data to be checked by the extended-reality system.

The extended-reality system may be configured to receive settings from a user to control at least one of: a data amount transfer over a wireless connection that may be used on request by other devices on the peer-to-peer network, an amount of memory on the extended-reality system that may be used to store data for access by other devices on the peer-to-peer network, whether the device is tethered, a condition on the battery life of the extended-reality system that controls whether or not other devices on the peer-to-peer network may access data from the extended-reality system.

The extended-reality system may be configured to predict a movement of a wearer of the extended-reality system. The data determining unit may be configured to determine extended-reality data to be obtained based on a predicted movement of the wearer.

The extended-reality system may be configured to obtain traffic information. The traffic information may relate to movement patterns of users of extended-reality systems. The data determining unit may be configured to determine extended-reality data to be obtained based on the traffic information.

The extended-reality system may be configured to obtain information about how many users are in a local area or historical information about numbers of users in a local area. The extended-reality system may be configured to obtain information about network coverage in an area covered by a base station. The extended-reality system may be configured to decide to pre-fetch data based on information about how many users are in an area or expected to be in an area and/or information about network coverage in an area.

The extended-reality system may be configured to contact the remote network-connected storage in order to obtain information about devices that may be contactable via the peer-to-peer network.

The extended-reality system may be configured to receive a request for extended-reality data from a requesting device via the peer-to-peer network. The extended-reality system may be configured to send extended-reality data to the requesting device in dependence upon at least one of: bandwidth of a connection available between the extended reality system and the requesting device over the peer-to-peer network; a battery level of the extended-reality system; a strength of a connection between the extended-reality system and the requesting device; a power consumption required to communicate with the requesting device over the peer-to-peer network; and a trust level of the requesting device.

The extended-reality system may be configured to receive a request to obtain extended-reality data not present on the extended reality system from a requesting device on the peer-to-peer network. The extended-reality system may be configured to obtain the extended-reality data from the remote network-connected storage on behalf of the requesting device. The extended reality system may be configured to determine whether to obtain the extended-reality data from the remote network-connected storage on behalf of the requesting device in dependence upon at least one of: a quality of at least one of a connection between the extended-reality system and the remote network connected storage and the connection between the extended reality system and the requesting device over the peer-to-peer network (for example signal strength, communication system, or communication bandwidth); a battery level of the extended-reality system; a power consumption required to communicate with at least one of the requesting device and the remote network-connected storage; the latency involved in retrieving the requested extended-reality data; and a trust level of the requesting device.

The communication method determining unit may be configured to request the extended-reality data to be obtained from the peer-to-peer network before sending a request to the remote network-connected storage. The request to the remote network-connected storage may be sent to the storage via servers, routers, gateways and other intermediate network elements. Such embodiments may be able to access extended-reality data with higher bandwidth and lower latency.

The communication method determining unit may be configured to request the extended-reality data to be obtained from the remote network-connected storage before sending a request over the peer-to-peer network.

The extended reality system may include at least one of: a smartphone and smart glasses, also known as a Head Mounted Display (HMD). The extended reality system may comprise a user interface for displaying image data derived from the extended reality data. The extended reality system may further include an audio delivery system, either integrated into the extended reality system or as an optional attachment. The system may further include a smart watch or other extended-reality capable device.

A second embodiment provides a method for obtaining extended-reality data for an extended-reality system, the method comprising: determining extended-reality data to be obtained based on a location of the extended-reality system; determining a communication method for obtaining the extended-reality data, wherein the extended reality data may be obtained by one or more requests to the remote network-connected storage or by one or more requests to a local device outside of the extended-reality system via a peer-to-peer network, which local device has previously obtained the extended-reality data from the remote network-connected storage; and sending a request to at least one of the local device via the peer-to-peer network and the remote network-connected storage in dependence upon the determined communication method.

A third embodiment provides a non-transitory computer-readable storage medium storing instructions that, when executed by an extended-reality system, cause the extended-reality system to perform a method comprising: determining extended-reality data to be obtained based on a location of the extended-reality system; determining a communication method for obtaining the extended-reality data, wherein the extended reality data may be obtained by one or more requests to the remote network-connected storage or by one or more requests to a local device outside of the extended-reality system via a peer-to-peer network, which local device has previously obtained the extended-reality data from the remote network-connected storage; and sending a request to at least one of the local device via the peer-to-peer network and the remote network-connected storage in dependence upon the determined communication method.

Specific embodiments will now be described, with reference to the figures.

XR System

FIG. 1 is a schematic diagram showing components of an extended reality (XR) system 100. The term 'extended reality' is used in the present application, but the terms mixed reality (MR), virtual reality (VR) and augmented reality (AR) are also used in the art. The term 'extended reality' would be understood by the person skilled in the art to encompass all those terms as well as any other type of immersive technology. The XR system 100 includes an XR device, such as a headset, a pair of smart glasses, or any other type of suitable wearable device as will be described in greater detail in connection with FIG. 2. The functions of the XR device are, in general, supported by processing performed by other devices, such as processing performed by a connected mobile device, such as a mobile phone or laptop. The XR system is capable of being connected to the a communication network, such as the internet, and is provided with access to cloud-based data and processing either by direct connectivity from the wearable device, or by connection to an associated mobile device.

The XR system 100 includes one or more sensors 102 arranged to generate sensor data representing part of an environment in which a user of the XR system 100 is located. The sensors 102 include one or more image sensors, for generating image data representing part of the environment falling within a field of view of the sensors. A forward-facing image sensor is configured so as to have a field of view substantially similar to the field of view of the user wearing the associated device. Further image sensors may be arranged to capture data from the surrounding environment not visible to the user, for example on the lateral sides of the wearable device.

The sensors 102 include depth sensors to capture depth information. The depth sensors may include stereo cameras from which the XR system 100 can derive, using stereo matching, depth information indicating distances to objects in the environment. In other embodiments, the depth sensors include an infrared camera, a sound navigation ranging (sonar) transceiver, and/or a light detection and ranging (LIDAR) system. In some embodiments, no depth sensors are provided in the XR system 100 and/or no depth information is determined. In other embodiments, depth information may be derived from images captured by a camera using a convolutional neural network for monocular depth estimation. The XR system 100 is configured to combine image data and, if available, associated depth information to generate a representation of part of the environment, for example in RGB (and -D if available) format, and/or as a point cloud or volumetric representation. In other embodiments gray scale or luminance representation may be used.

The sensors 102 include position sensors for determining a location, position and/or orientation (referred to collectively as a pose) of the user of the XR system 100. The position sensors may include a global positioning system (GPS) module, or any other location- and orientation-sensing device, for example an accelerometer or gyroscope. The XR system 100 can determine or refine an estimated position of the user by analysing image data and/or depth information using Simultaneous Location and Mapping (SLAM) techniques. This SLAM process is, in general, not processor intensive and is run continuously while the XR system 100 is operational. SLAM provides location with relatively low latency, perhaps in the order of 5 MS.

The XR system 100 includes a user interface 104 via which the user can interact with the XR system 100. The user interface 104 includes input devices and output devices, some or all of which may be part of the same XR device as the sensors 102. The output devices include one or more displays for providing visual information to the user. The one or more displays may include an opaque display arranged to generate and display image data corresponding to a representation of part of the environment generated using the one or more cameras and/or depth sensors, with additional information or virtual objects overlaid or otherwise combined with the generated representation of the environment. A transparent display may be provided through which the user can directly observe the environment, and on which information or virtual objects are projected, for example using waveguiding or laser scanning display technology. The XR system 100 includes a user interface 104 via which the user can interact with the XR system 100.

The output devices may additionally include one or more speakers, for example mounted in an earpiece or headphones, allowing the XR system 100 to output information to the user in the form of audio.

The input devices of the user interface 104 are arranged to receive information from the user of the XR system 100. The input devices may include one or more local microphones for capturing speech or other sounds made by the user, as well as a microphone array configured to detect external sounds from the environment.

The input devices may further include one or more buttons or touch input devices—for example scroll-wheels, touch-sensitive regions or trackpads. The input devices may include hardware and/or software to make use of gesture recognition, eye tracking/blinking, and speech recognition. In further variations, user interface functions may be provided by the user interface of a separate device in communication with the remainder of the XR system 100, such as a mobile phone touch screen. As mentioned above, the input devices may be part of an XR device housing the sensors 102 or may be part of a separate remote device.

The XR system 100 includes a memory 108 and processing circuitry 110. The memory 108 and the processing circuitry 110 may be part of an XR device housing the sensors 102. Alternatively, as mentioned earlier, some of the memory 108 and the processing circuitry 110 may be part of one or more separate devices, for example a dedicated computing device, a smartphone, a tablet or laptop computer, a desktop computer, a server, or one or more devices in a networked system. In examples, certain data storage and processing tasks take place locally at an XR device, whilst other data storage and processing tasks take place remotely. In this way, the data storage and processing performed by the XR device can be kept to a necessary minimum, allowing the XR device to have a size, weight and form factor that are practical and attractive for prolonged use and/or everyday use of the XR device.

The memory circuitry 108 includes non-volatile storage, for example in the form of one or more solid-state drives (SSDs), and/or NVRAM (Non-Volatile RAM) along with volatile random-access memory (RAM), for example static random-access memory (SRAM) and dynamic random-access memory (DRAM). Other types of memory can be included, such as removable storage, synchronous DRAM, and so on.

The processing circuitry 110 may include various processing units including a central processing unit (CPU), a graphics processing unit (GPU) and/or a specialist neural processing unit (NPU) for efficiently performing neural network operations. Neural networks may be used for certain tasks including object detection and SLAM. The processing circuitry 110 may include other specialist processing units, such as application specific integrated circuits (ASICs), digital signal processors (DSPs), or field programmable gate arrays (FPGAs).

The memory 108 holds machine-readable instructions in the form of program code which, when executed by the processing circuitry 110, cause the XR system 100 to perform methods as described hereinafter. The memory 108 is also arranged to store further data for use in performing said methods.

Figure 2:
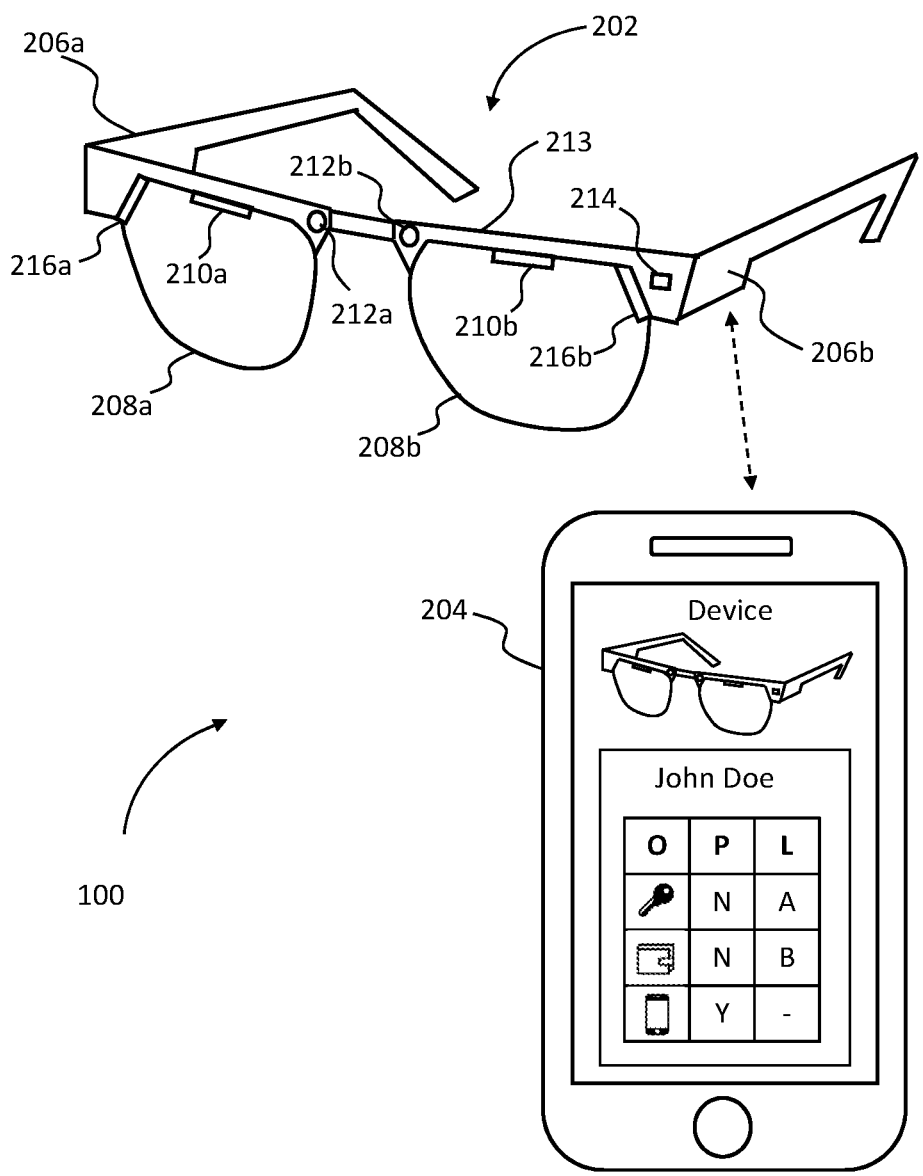
FIG. 2 depicts a pair of smart glasses 202 and an associated app.

FIG. 2 illustrates a pair of smart glasses 202 and an associated app on a smartphone 204 forming part of an XR system 100. The smart glasses 202 include a central frame portion 213 and two folding arms 206a, 206b, where the central portion 213 acts as a support for two lenses 208a, 208b. The central frame portion 213 and the arms 206a, 206b house various sensors and user interface components, as will be described below. The lenses 208a, 208b in this example are neutral, though in other examples the lenses could be corrective lenses matching a prescription of a specific user, and/or could be tinted, for example in the case of smart sunglasses 202. Each of the lenses 208a, 208b is a transparent display on which a corresponding projection component 210a, 210b is arranged to display information for the user.

The central frame portion 213 houses two front-facing cameras 212a, 212b and side cameras (not shown) to capture images surrounding the user. The XR system 100 is arranged to analyse image data generated by the front-facing cameras 212a, 212b using stereo matching to determine depth information. The central frame portion 213 further houses a beam-forming microphone array 214 for receiving sound input both from the user and from the surrounding environment, and optical eye-tracking sensors 216a, 216b for tracking orientations and motion of the user's right and left eye respectively. The optical eye-tracking sensors 216a and 216b include associated processing circuitry for determining a direction in which the user is looking. The associated processing circuitry may include a neural processing unit (NPU) or an ASIC built into the smart glasses 202. The determination of the direction that a user is looking may be performed in different ways, but in the embodiment is performed using a trained convolutional neural network that can determine a probability that a user is looking in a particular direction based on eye position detected by the optical eye-tracking sensors 216a and 216b. The arms 206a, 206b house a dedicated power supply, processing circuitry and memory circuitry, as well as a global positioning system (GPS) receiver, an electronic compass, and accelerometers. The arms also include a communication module including an antenna for communicating wirelessly with the smartphone 204 running the associated app. It is noted that whilst the wireless communication module allows communication with the mobile smartphone 204, the smart glasses 202 may be used as a standalone device without continuous communication with the smartphone 204.

The smart glasses 202 include speakers (not shown), which cover the user's ears. In other embodiments, the smart glasses 202 are coupled to in-ear headphones, e.g. by Bluetooth®, and can provide sound to a user through the in-ear headphones. In an advantageous variant, the arms of the smart glasses 202 include bone conducting speakers, which provide sound to the user by vibration whilst continuing to allow the user to hear what is happening locally.

The XR system 100 is arranged to determine a position (i.e. location and orientation) of the user using the onboard satellite navigation (for example, GPS) receiver and the electronic compass of the smart glasses 202, and/or by processing image data from the cameras 212a, 212b using SLAM. The XR system 100 is configured to continually monitor the position of the user, but in other embodiments may determine the position of the user only when certain events are detected (for example, when movement of the user is detected by the accelerometers). In other embodiments, GPS positioning information may be provided by a connected Smartphone 204. Alternatively, or in addition, location and orientation information can be provided using SLAM, or may be provided through triangulation of the cellular network signal.

XR systems including various combinations of the features described above are available commercially. Examples include Microsoft® Hololens®, Nreal®, Action One by Shadow Creator®, and Magic Leap®. In an alternative embodiment, the XR display may be a display of a smart phone In one embodiment, the app on the smartphone 204 can be used to configure the smart glasses 202 in accordance with preferences of the user. For example, the user can use the app to select the type of information that is displayed on the lenses 208a, 208b, and whether the smart glasses 202 continually monitor the location of the user as mentioned above. The app has associated storage on the smartphone 204, which may be used in addition to the memory circuitry of the smart glasses 202 to store data for use by the XR system 100. The XR system 100 can further utilise processing capabilities of the smartphone 204 to perform certain resource-intensive processing tasks, such as SLAM. Sharing the storage and processing requirements of the AR system 200 between the smart glasses 202 and the smartphone 204 allow for the size, weight and form factor of the smart glasses 202 to be similar to a regular pair of glasses, such that a user can comfortably wear the smart glasses 202 for prolonged periods of times, and on an everyday basis. Although the smart glasses 202 are described in conjunction with a smartphone 204 in this figure, the smart glasses 202 may be configured as a standalone device.

Cloud Based Extended Reality

Due to the dynamic nature of XR, with the data involved being typically large and updated at a high rate, fetching the information well in advance and caching it on the device is impracticable. The XR data often needs to be retrieved as a user moves around an environment. Storing the XR data in a cloud environment allows multiple users to interact with the same or similar virtual environment, with multiple users being able to benefit from the XR information generated by each XR system. It also allows the data to be updated and refreshed on a more frequent basis, as the information generated by each user can be uploaded to the cloud, creating a constantly up-to-date pool of information that can be provided to all users accessing the cloud environment.

However, this approach requires that each device both retrieve XR information from and transmit XR information to the cloud environment on a frequent basis. Due to the nature of XR, this information may comprise high-resolution video and sound data, avatars, applications, neural network models, or similar high-volume data, meaning that significant bandwidth is required to communicate the information between the cloud environment and the device. The XR data may include anchor coordinates that are shared between several users of a common world space and avatar model information. It is also expected that the XR data will include information about the physical location that the XR device is exploring, such as a sparse point cloud.

Due to the mobile nature of modern XR systems, the user may be situated in an environment in which the mobile telecommunication network bandwidth available to their XR device is limited or variable, meaning that communication with the cloud environment may involve high degrees of latency, or may even be impossible. Even where the user has a strong mobile telecommunication network connection, communicating XR data between the XR device and the cloud is likely to consume a significant quantity of power. Consequently, direct communication between the device and the cloud environment via mobile telecommunication network is not always feasible.

Peer-to-Peer Communications

The physical locality of user XR systems can be exploited to overcome these obstacles. Devices in the same or nearby physical locations will likely need to retrieve similar information from the cloud environment. A reason for this may be that XR data from the cloud environment is overlaid on the environment surrounding the XR system for the wearer of the smart glasses 202 and, as a consequence, several users looking at the same buildings or other objects in the environment will require the same XR data. In many cases multiple users will be viewing the same or similar scenes and/or other users may have visited the location in the recent past. For example, an avatar of a remote user may be visible to all/some of the users in the area; e.g. avatars in a meeting room will likely be visible to all people physically in the meeting room.

By connecting the XR systems to each other via a peer-to-peer network using short-range, energy-efficient wireless communication protocols, XR data pertaining to the physical location may then be shared between devices connected to this peer-to-peer network, reducing the requirement for each device to communicate separately with the cloud environment. In the embodiments below, a case in which the smartphone 204 of each XR system communicates with other smartphones 204 of other XR systems will be described. However, in other embodiments the smart glasses 202 may perform the communication and it makes no difference whether the communication is performed by the smartphones 204, the smart glasses 202, or other communication device.

The smartphone 204 has functionality for communicating with other smartphones and, more generally, other devices 204 via a peer-to-peer network. A smartphone 204 may request XR data from other devices on the peer-to-peer network. If the requested data is present on a second device on the peer-to-peer network, it may be communicated to the first device using the short-range, low-power peer-to-peer connection. If no other device on the peer-to-peer network contains the requested XR data, the first device may request the XR data directly from the cloud environment or may make a request that it be retrieved from the cloud environment using the mobile telecommunication network connection of a second device, then communicated to the first device across the peer-to-peer connection.

Figure 3:
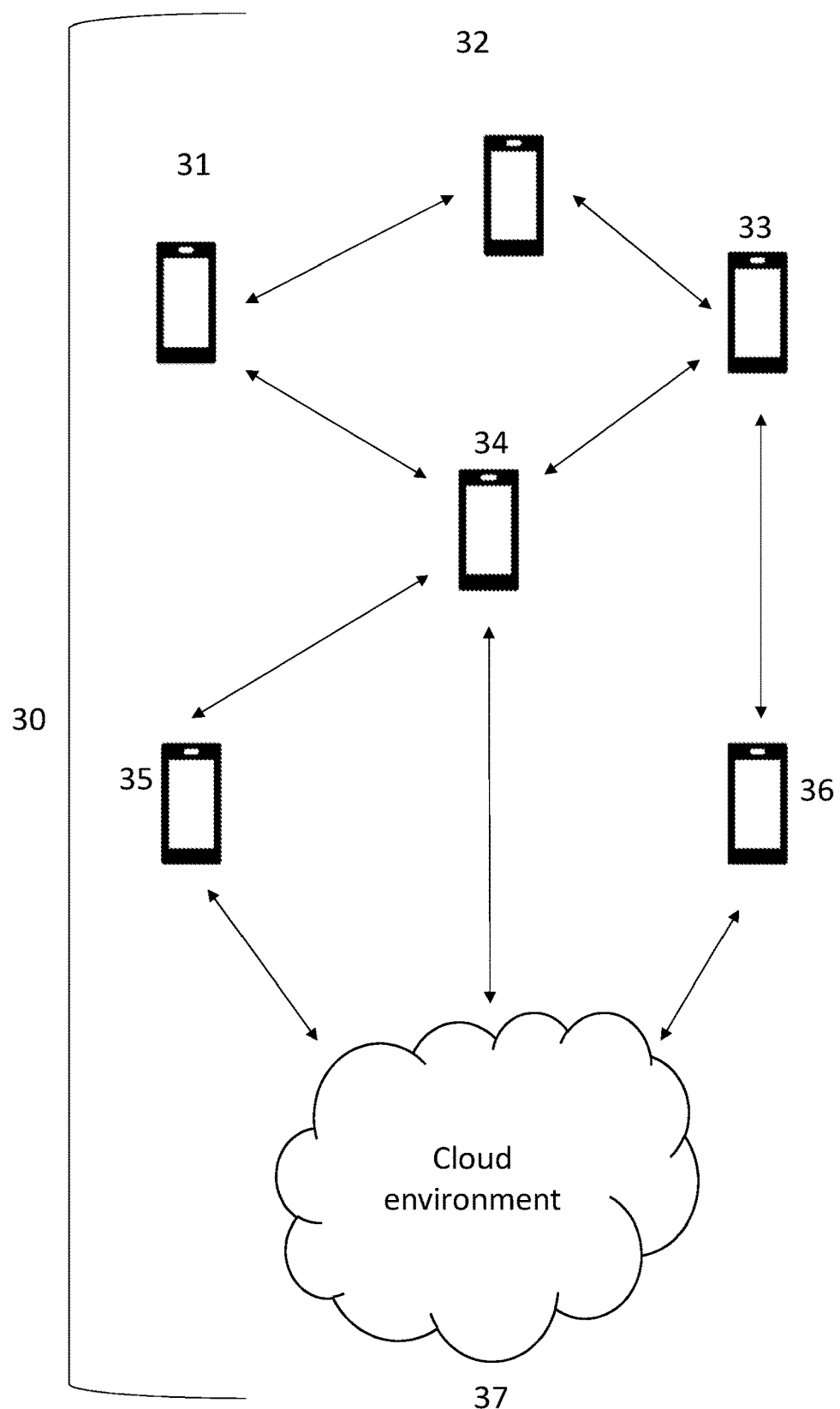
FIG. 3 is a diagram of a peer-to-peer network.

FIG. 3 is a diagram of an exemplary peer-to-peer communication network. In peer-to-peer networks, files may be shared between a plurality of interconnected devices without the need for a central file server. Each device functions as a separate server, as well as a network client. Once connected to the peer-to-peer network, when a device requires a file or piece of data, it can search all other connected devices on the network by sending a request for the XR data. Typically, each connected device will have a dedicated folder containing XR data accessible to the peer-to-peer network, while the rest of the device remains private.

In the embodiment shown in FIG. 3, a plurality of devices 31 through 36 are connected to a peer-to-peer network 30 and have the capacity to connect to cloud environment 37. Each device may be a smartphone 204 that provides information to smart glasses 202 of users of devices 31 through 36. Some of the devices could also be nearby computers or other devices as will be explained further below. In one embodiment, the peer-to-peer connectivity of the network is enabled by the Wi-Fi Direct Peer-to-Peer (P2P) service. This service allows compatible devices to interact directly with each other using the Wi-Fi communication protocol, without an intermediate access point such as a router. Using this P2P system, each device can discover and connect to other devices on the peer-to-peer network, then communicate between the devices. Other peer-to-peer services, such as Bluetooth or WiGig (IEEE 802.11ad, IEEE 802.11ay), may be used. Peer-to-peer services such as WiGig can provide short range high bandwidth connections, perhaps offering data rates as high as 8 GB/sec.

In embodiments where the Wi-Fi P2P service is used to enable peer-to-peer communication, searching for nearby devices on the peer-to-peer network is accomplished using the Network Service Discovery (NSD) function. This function implements the DNS-based Service Discovery (DNS-SD) mechanism, allowing an application—in this case, an XR application—to request services by specifying a type of service—such as a file-sharing service—and the name of a device instance that provides the desired type of service. DNS-SD is supported both on Android and on other mobile platforms.

A portion of the storage of each device 31 through 36 is used as a dedicated cache for the peer-to-peer network. This means that in a case that the device requests and receives XR data, from cloud environment 37, a copy of the XR data is saved to the dedicated storage portion on the device.

When a device receives a request for XR data from another device, the device searches the cache to see if the XR data is available on that device. If the XR data is not available, the device may either ignore the request or send a reply message indicating that the XR data is not available. If the XR data is available, the device may consult a set of rules to determine if the data is to be made available to the requesting device. The rules will be described further below. If it is determined that the XR data is available, the device returns the copy of the XR data. The ability to obtain XR data from other local devices over the peer-to-peer network may reduce energy consumption, reduce network traffic on the local telecommunications network, and improve latency.

In some embodiments, a caching protocol may additionally be used to control the XR data caching on the smartphone 204. Using this protocol, each data item stored in the cache contains metadata that indicate the nature of the item in question and specifies a directive for the caching mechanism. Each XR data item received from the cloud environment 37 is cached according to a metadata field in the XR data item identifying at least one of the following:

Not cached: The cache should not store anything about the XR data item. A request is sent to the cloud environment and a full response is downloaded for this XR data item each and every time.

Cache but revalidate: The cache will store the XR data item, but the device will send a request to the cloud environment for validation before releasing a cached copy.

Public directive: the XR data item may be cached and released to any requesting device.

Private directive: the response is intended for a single user only and must not be stored in a shared cache. The items are only for use by the particular XR system for which it was received.

Expiration: this signals the maximum amount of time for which the XR data item is "fresh." Before this time has elapsed, the XR data item may be returned in response to the request. After it has elapsed, a new response must be fetched from the cloud environment.

Validation: this indicates whether the cached copy must be revalidated before transmission.

Figure 4:
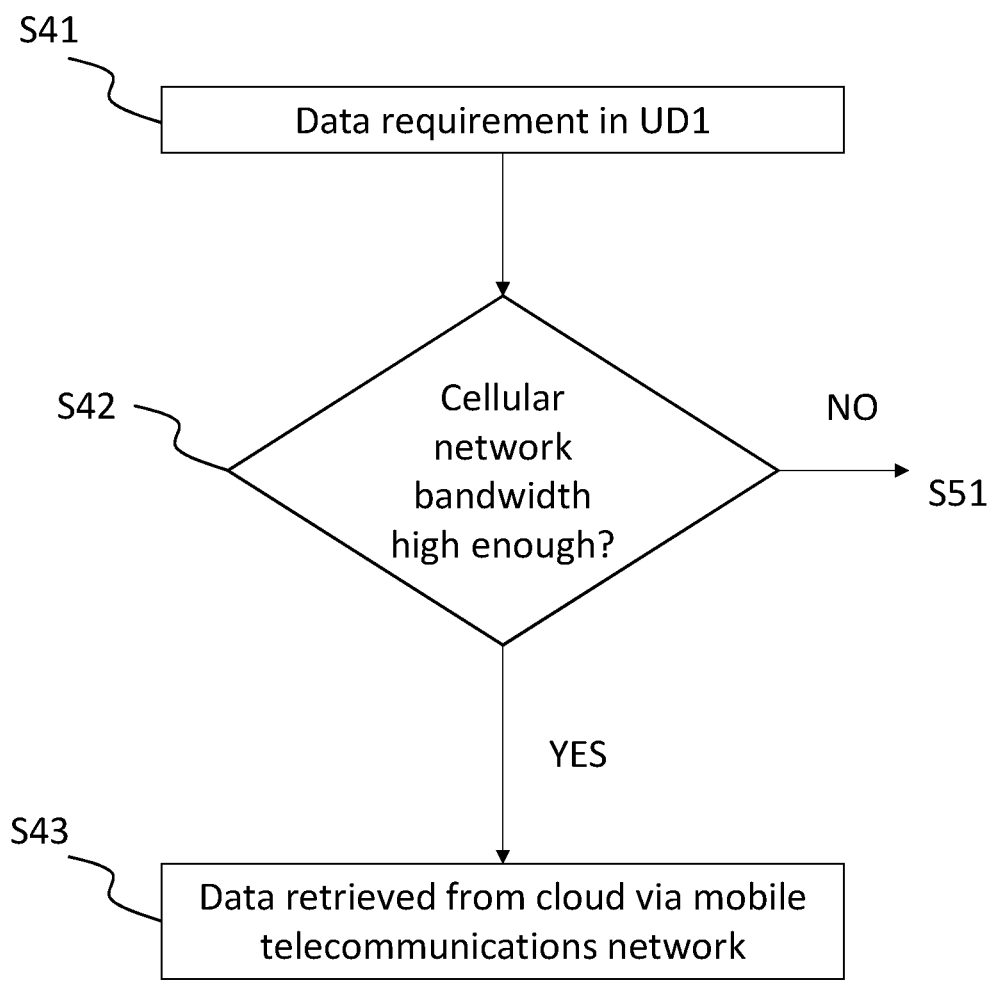
FIG. 4 is a flowchart of steps to retrieve XR data from a cloud environment.

FIG. 4 is a flowchart of a process by which a first device 31 may obtain XR data, such as a smartphone 202 requesting XR data for a user's smart glasses 202. In step S41, a request for XR data is generated in a first device 31. If the XR data requested is already stored on the first device 31, the XR data is sent from the first device 31 to the smart glasses 202 where it is used by the user. However, as the user moves around an environment it is likely that data is requested that is not already on the first device 31 and must be retrieved from elsewhere.

In step S42, it is then determined whether the first device 31 has a mobile telecommunication network connection of sufficient bandwidth to allow the XR data to be retrieved from the cloud environment 37 directly. If this step determines that the first device 31 has sufficient bandwidth to retrieve the requested XR data from the cloud environment via a mobile telecommunication network, or the energy required to access the data is larger than other protocols, the XR data will be retrieved via the mobile telecommunication network and communicated to device 31 in step S43. This step may involve comparing an amount of XR data to be retrieved with an available bandwidth on a connection between the first device 31 and the mobile telecommunication network and comparing the bandwidth with a threshold. In cases in which a small amount of XR data needs to be retrieved and a high-bandwidth connection, such as 5G, is available then the device will obtain the XR data without using peer-to-peer communication. On the other hand if a large amount of data needs to be retrieved relative to the bandwidth, which may cause latency to increase, or the signal with the base station is weak, and therefore the available bandwidth low and the power required to transfer the data is high, it may be determined that the bandwidth does not meet a threshold requirement in step S42.

Figure 5:
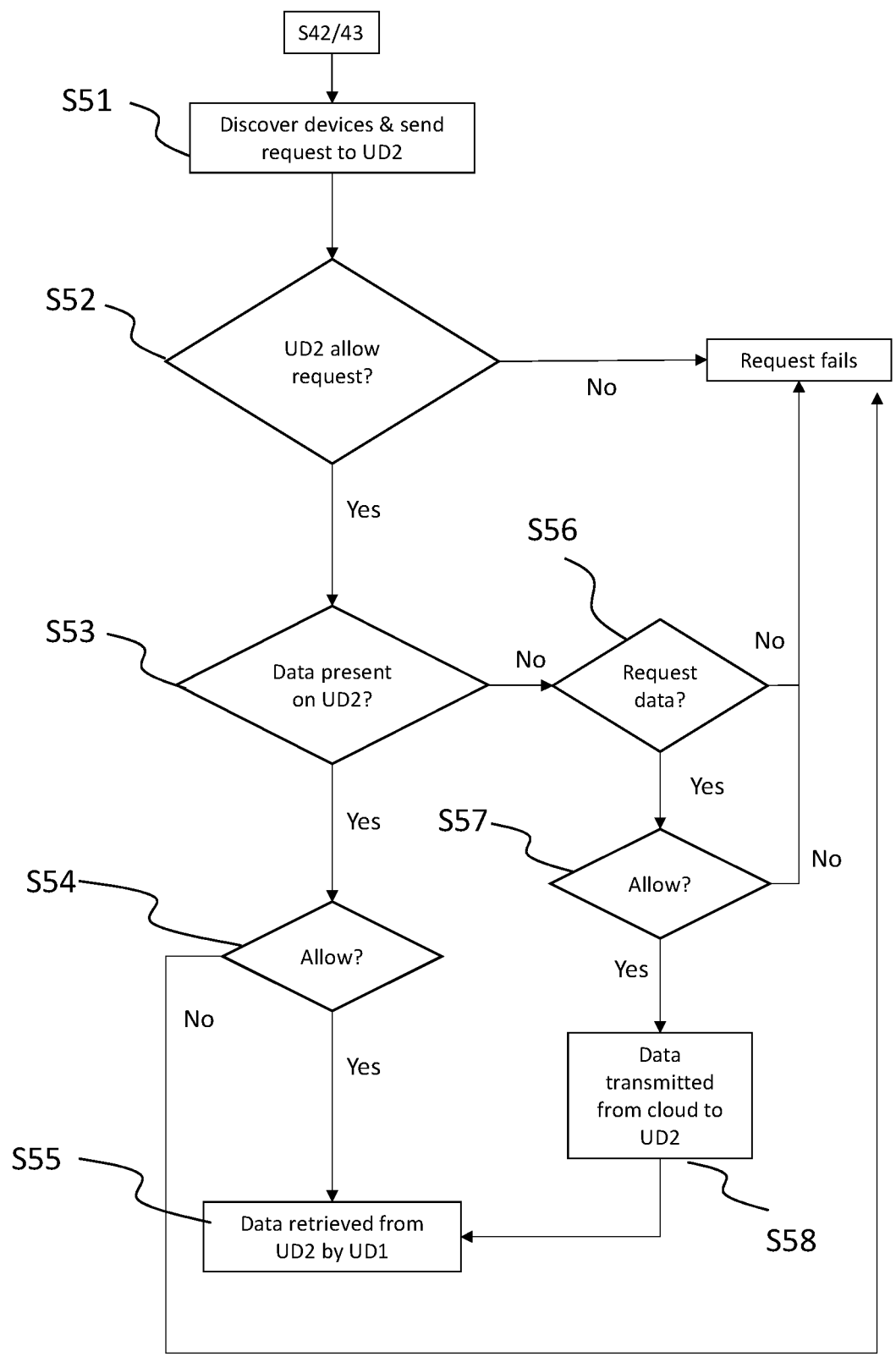
FIG. 5 is a flowchart of steps to retrieve XR data from a cloud environment via a peer-to-peer network.

If at step S42, the first device 31 is determined to have insufficient bandwidth, the process will pass to step S51 in FIG. 5.

FIG. 5 is a flowchart showing the process by which the first device 31 may retrieve information from the cloud environment 37 via the peer-to-peer network 30.

In step S51, the first device 31 sends a discovery request for nearby devices on the peer-to-peer network. Upon discovering a second device 34, first device 31 sends a file-sharing request to the second device 34 across the Wi-Fi P2P connection. In step S52, second device 34 may accept or reject the request from first device 31 based on whether the device participates in peer-to-peer sharing of XR data. This decision may be based on user preference—such as a setting on the device—or may be based on other criteria. If the request is rejected, the request will fail, and first device 31 will not receive the requested XR data from the second device 34.

If the request is accepted, in step S53 it is determined whether or not the requested XR data is present in a cache of second device 34. If the requested XR data is present in the cache, in step S54, second device 34 may compare the XR data request from the first device with a set of rules. This set of rules may include rules based on considerations, such as device battery level, bandwidth of the available peer-to-peer network communication with the first device, power consumption of the transmission peer-to-peer network, and level of trust of the first device making the request.

A first consideration is device battery level. If the battery level of the second device 34 is below a predetermined level, transmission of the XR information to first device 31 may be blocked by the second device 34. This predetermined level may be applied regardless of how low the power consumption of the transmission may be. Consequently, if the battery level of second device 34 is below a certain level, the device may not permit the XR data to be retrieved by first device 31. The level at which permission will not be granted may be set by the user or may be a preset value within the XR peer-to-peer application.

A second consideration is bandwidth of the available peer-to-peer network communication between the first device 31 and the second device 34. If the bandwidth is below a predetermined level, the second device 34 may block the retrieval of the requested XR data by first device 31. This rule may prevent the second device becoming involved in a time-consuming transmission or a transmission that may occupy a significant amount of the second device's available bandwidth. This consideration may also take into account the latency of data retrieval over the peer-to-peer network connection. This rule may also be beneficial for the first device, which may require the XR data with a relatively low latency.

A third consideration is the power consumption of the transmission across the peer-to-peer network. Users will likely expect their device to be energy-efficient and to have good battery life. If the power consumption of the transmission is above a certain level, it will likely prejudice the energy-efficiency and battery life of the second device 34, regardless of the battery level of the device in question. A rule may be set that blocks transmissions above a threshold level of power consumption. Such a rule may be set by the user or may be a preset feature of the XR peer-to-peer application.

A fourth consideration is the level of trust. Different devices on the peer-to-peer network may have different levels of trust. For instance, a device on the peer-to-peer network that is a local Wi-Fi access point may be set to have a higher level of trust than another third-party device. A user may specify the minimal level of trust for local devices that they may receive from or transmit data to, and devices with a lower level of trust will be rejected by that device. Levels of trust for devices may be managed within the cloud-based environment and could be set based on length of use of the cloud-based XR service, appropriate identity verification checks having been performed for the owner of the device, etc.

A further rule may be set that indicates a maximum amount of data that may be transferred from the second device in a given time period. This allows a user to indirectly control an amount of resources on the smartphone 204 that will be allocated to sharing XR data. However, the software that controls the second user's access to the peer-to-peer network may be configured so that setting a limit on the maximum amount of data that may be transferred from the second device in a time period applies a corresponding limit on an amount of data the second device may request from or receive from other users.

Provided that all rules that are currently configured on the second device are met, in step S54, the requested XR data will be sent by the second device 34 by the first device 31 in step S55.

Returning to step 53, if it is determined that the requested XR data is not present in the cache of second device 34, at step S56, it is determined whether the second device 34 enables a function to request the XR data from cloud environment 37 on behalf of the first device 33, via the mobile telecommunication network connection of second device 34. The function of requesting XR data on behalf of the first device is contingent upon permission being given by a setting within the second device 34. In step S56, second device may or may not allow data to be retrieved or transmitted via its mobile telecommunication network connection.

In step S57, if the second device does allow requesting of data on behalf of the first device, a second set of rules is consulted which governs the requesting of XR data on behalf of the first device. The considerations governing these rules are comparable to those described above in relation to the rules that govern retrieval of the requested information from the cache of second device 34. The rules consider factors such as battery level of the second device, strength of the signal that the second device has on a mobile telecommunications or other network, and available bandwidth on the mobile telecommunications or other network.

A rule in the second set of rules may indicate that data will not be requested on behalf of another device if the battery level of the second device is below a predetermined level. The predetermined level may be preset or set by a user.

The request for XR data received from the first device 31 may include information about the strength of the signal and bandwidth available at the first device 31 requesting the data. Accordingly, a rule in the second set of rules may include a rule that a data request will only be made on behalf of the first device if the signal strength and/or bandwidth available to the second device 34 on a mobile telecommunication network is more than a predetermined amount better than the signal and/or bandwidth available to the first device 31 according to the information in the request for XR data.

A rule relating to power consumption may include a condition based on the power consumption of both the peer-to-peer network communication and the mobile telecommunication network connection. It is possible for the power consumption of one of the two connections to be comparatively low while the other is high. For instance, the user may be close to a mobile telecommunication network base station, but a great distance from another P2P Wi-Fi user. As such, the power consumption of both transmission networks is considered in the rule. If the power consumption of either network, or of the combined networks, exceeds a specified value, the rule will not be met, and the request will fail.

A rule relating to bandwidth may also be based on bandwidth available to the second device 34 over the mobile telecommunication network connection and the bandwidth available between the first device 31 and the second device 34 over the peer-to-peer connection. If both networks have bandwidth above predetermined thresholds to support transmission of the requested XR data, permission will be granted by the rule. However, if the bandwidth of either the mobile telecommunication network or of the peer-to-peer connection is below a threshold value, the rule will not be met, and the request will fail the rule.

Provided that the rules currently set on the second device 34 are all met, in step S58 the second device 34 will retrieve the requested XR information from the cloud environment 37 via a mobile telecommunication network connection. In step S59, the requested information will then be sent from the second device 34 to the first device 31, across the peer-to-peer Wi-Fi connection.

The embodiments described above refer to a first device 31 retrieving data from the cloud environment 37 either via a mobile telecommunication network connection or, depending on the situation, via a peer-to-peer network through a second device 34. A similar process is followed for a situation in which data is uploaded from first device 31 to the cloud environment 37. The first device 31 will generate XR data, then (as in step S42 and 43) will consider the considerations discussed above (battery level, power consumption and bandwidth requirements). If these considerations all indicate that the XR data can be successfully transmitted directly by the mobile telecommunication network connection, this will be done. If not, the first device 31 will perform a search of the peer-to-peer network for nearby devices, then send a file-sharing request to such a device (such as second device 34), as in step SM. The second device 34 will then determine whether or not to allow data to be transmitted through using its mobile telecommunication connection, considering power level, power consumption, bandwidth and trust, as in step S57. If these considerations are positive, the XR data will be transmitted from first device 31 to second device 34 via the peer-to-peer network connection, then from second device 34 to cloud environment 37 via the mobile telecommunication network connection.

In the embodiment described in connection with FIGS. 4 and 5, the first device accesses XR data via a mobile telecommunications network preferentially and then attempts to retrieve the data over the peer-to-peer network. In other embodiments, battery life may be considered to be a high priority and the devices may be configured to try to retrieve data preferentially over the peer-to-peer network and then, if the XR data is unavailable from cached data on local devices on the peer-to-peer network, request the XR data from the cloud environment using the mobile telecommunications network. Such an approach may allow power savings because short range peer-to-peer communications, such as Wi-Fi or Bluetooth® use less power per bit and may support higher bandwidths than communication with a mobile base station of a telecommunications network.

In some embodiments, a device may be configured so that when the device has less than a predetermined level of battery life, the device switches to a mode in which it accesses XR data from the peer-to-peer network in preference to accessing XR data via the mobile telecommunications network, but the device blocks requests for XR data from other devices in order to further conserve power. In contrast, when such a device has above the predetermined level of battery life, the device makes requests for XR data but also allows requests for XR data by other devices subject to any other rules configured on the device.

Figure 6:
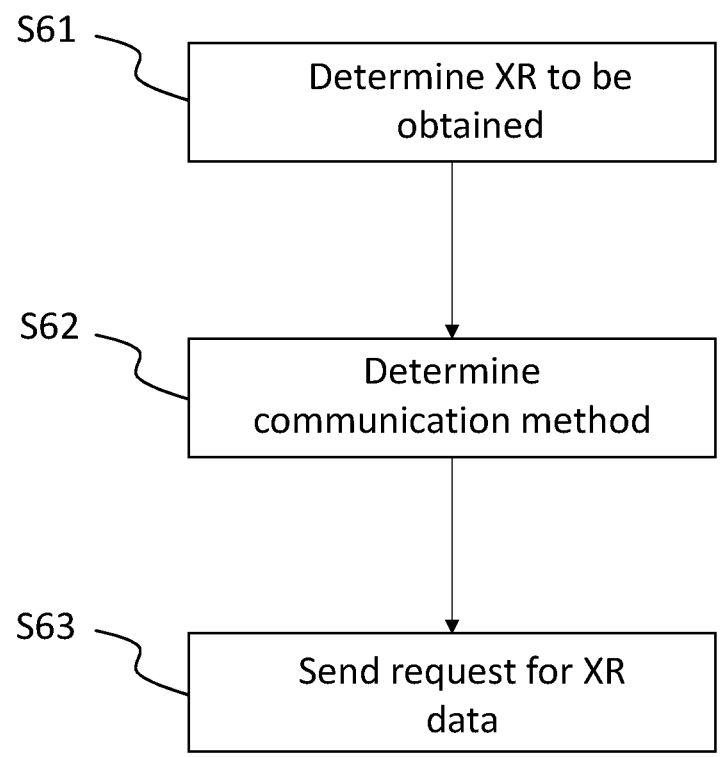
FIG. 6 is a flowchart showing steps performed by a device to request XR data.

FIG. 6 is a flowchart showing steps performed by a XR system (smartphone 204 and/or smart glasses 202 or other device) when requesting XR data. In step S61 the XR system determines that XR data is to be obtained. In some embodiments, this may involve requesting XR data relating to locations within a predetermined distance of the current location of the smart glasses 204.

In other embodiments, the smartphone 204 may monitor user location, activity and routines, in order to predict where the user is likely to go and determine XR data to be obtained based on that information. The information about the user's location history, activity history etc. may be stored on the smartphone 204 or in the cloud environment. The information about the user's location history may be kept private to the user. Using this information, the first device may then request, via the peer-to-peer network, XR data relevant to adjacent locations in which the user will likely soon be travelling. In doing so, the XR data for the device can be pre-fetched, updated and refreshed seamlessly and constantly, minimizing the latency in providing the XR data to the user.

In some embodiments, the smartphone 204 may receive information or generate information on a direction of travel by performing SLAM on image data received from a camera of the smart glasses 202. The smartphone 204 may request XR data based on the calculated direction of travel of the XR system.

In some embodiments, each device may send periodic requests on the peer-to-peer network in order to discover local devices on the peer-to-peer network. The devices on the peer-to-peer network may request and exchange information about local device location and mobile telecommunication network signal strength, bandwidth or other mobile telecommunication network performance related parameters. Based on information about the mobile telecommunication network performance in the local area, the device may prefetch XR data relating to locations with slower or non-existent mobile telecommunication network coverage prior to the user moving into such locations.

In further embodiments, a service may provide traffic information about local traffic patterns for users within a geographical area. The traffic information may be anonymized. For example, the base station of a telecommunications network may measure and record movement of users in the cell at different times of the day and the telecoms operator may publish that data. In other implementations, the information may be gathered locally, such as by an art gallery, by automated people counting from video surveillance footage and make that data available. The device may contact the base station, a cloud service, or an edge data center connected to or close to the base station and use this traffic information to prefetch XR data that is likely to be requested by the XR system. For example, traffic data may show movement of users through a railway station. Devices may retrieve the traffic information and use it to make requests to pre-fetch XR data as the user moves through the railway station.

In further embodiments, a third party, such as a telecoms operator, public transport operator, art gallery etc. may also monitor a number of users in an area at different times, such as an on a daily, monthly or annual basis and provide this information to the device. The device may use the information about the numbers of users to determine the appropriate communication method. Accordingly, if there are expected to be few local devices in the area, the device may preferentially request XR data via the telecommunications network. In contrast, if there are expected to be many other local devices, the device may preferentially request XR data via the peer-to-peer network.

The base station may also monitor bandwidth drop off in different locations away from the base station. This information may be retrieved by the device and used to determine which XR data to pre-fetch. For example, a base station in a city may analyse movement of users towards an underground train station, a location known to have poor mobile telecommunication network connectivity. The device may determine based on expected signal drop-off to prefetch XR data relevant to the underground station location, meaning that the relevant data can be seamlessly retrieved across the peer-to-peer network.

In step S62, the device determines a communication method by which to obtain the required XR data. As described above, the device may prioritize retrieving XR data from local devices over the peer-to-peer network, which may allow improved battery life and reduced latency. The device may set a timer when a first request is sent over the peer-to-peer network and the device may switch to obtaining XR data from a local telecommunications network if the requested XR data is not received from the peer-to-peer network within a predetermined time period. If a local telecommunications network is not available or the XR data cannot be retrieved in time due to poor signal, latency or bandwidth constraints, the XR system my either continue operation without the requested XR data and/or display an error message.

In other embodiments, the device may preferentially obtain data over the local telecommunications network but may also obtain data from local devices over the peer-to-peer network, which may balance a user preference not to share their smartphone resources with a desire for continuous access to XR data. In this case, the device may make a request to the peer-to-peer network in a case that a local telecommunications network is unavailable or based on a condition on the signal strength, available bandwidth or latency of the connection to the local telecommunication network. As before, if the XR data cannot be obtained in time from either the telecommunication network or the peer-to-peer network the XR system my either continue operation without the requested XR data and/or display an error message.

In some embodiments, the device may send a request including its location to the cloud service and receive information about the locations of other nearby devices. In some implementations, the device may also notify the cloud service about the XR data that it is requesting and may receive information about the locations of local devices that have recently requested that XR data. As the request including the device location is not large, such a communication to the cloud service over the telecommunication network may not have a large effect on latency. The information received from the cloud service may be used to determine an appropriate communication method in step S62. For example, if the cloud service indicates that no devices are present in the local area with the XR data that the device is to obtain, the device will request the XR data from the cloud service via a mobile telecommunications network. If the cloud service indicates that one or more local devices are likely to have the XR data to be obtained, the device may proceed to request the XR data via the peer-to-peer network.

The device may decide to obtain the XR data using more than one communication method in step S62. For example, the device may decide to split the XR data to be obtained into portions depending on available bandwidth of different communication channels and to obtain the XR data both from the peer-to-peer network and from the mobile telecommunications network. Alternatively, or in addition, the device may obtain XR data from more than one device on the peer-to-peer network.

In step S63, the device sends a request for XR data using the communication method determined in step S62. Handling of requests for XR data has been discussed above and the device may or may not receive the requested XR data depending on availability and settings of local devices on the peer-to-peer network.

Security is a concern when transmitting information over peer-to-peer networks. Due to the nature of peer-to-peer networks, data transferred over such networks must necessarily pass through third-party devices. As such, it is desirable to include security features to ensure that the contents of each transfer are valid. In some embodiments, this may be achieved using cryptographic signatures. Each item of XR data or content, every application, may be cryptographically signed by the cloud service to mark that it is valid and that it has not been interfered with. In other embodiments, a hash may be used for this purpose.

Data stored in a device's cache may be deleted from the device cache in dependence on various conditions. In some embodiments, geographic regions are defined within the XR data stored in the cloud environment. These geographic regions might correspond to different areas of an art gallery or museum, or an area of a railway station etc. In a case that the user is detected as having left a region, the cached XR data for that region may be deleted in order to provide space for caching XR data about a current region that is likely to be more relevant to the smart glasses 202 and other devices requesting cached XR data.

A situation may arise in which there is more XR data for a region than can be cached within an allocated storage on the device. In this case, a first device may send a message on the peer-to-peer network identifying some XR data identified by the first device for deletion from the storage. If another device on the peer-to-peer network responds to indicate that it is currently caching the identified XR data, then the first device will delete the XR data from its storage, as it can retrieve the XR data again later from the peer-to-peer network if needed. If no local device, responds to indicate that it is currently caching the identified XR data, the first device may send a second message over the peer-to-peer network to offer the XR data for caching. Another local device with available storage space in its cache may accept the XR data for caching. This may be convenient as it keeps the XR data available locally on the peer-to-peer network for later retrieval if needed. If the first device is not able to send the XR data for caching on another local device on the peer-to-peer network, the first device may need to delete the XR data anyway in order to make space available for other XR data needed by the device.

In a further embodiment, information about users on the peer-to-peer network may be exchanged between users as required. Upon two devices on the peer-to-peer network connecting, public information about each user may be seamlessly and automatically transferred to the other user's device. For example, in a meeting environment, virtual business cards corresponding to each user may be handed over.

In the embodiments described above, the XR data has been stored in a cloud environment. In further embodiments, the XR data may be stored more locally, i.e. XR data specific to a physical location or areas may be stored close to those physical locations or areas. In some embodiments, the XR data may be stored on the edge of the telecommunications network. The XR data may, for example, be stored on an edge data center, which could for example be located at a base station or close to a base station.

The embodiments above have described the devices as smartphones 204 with connected smart glasses 202. However, the devices may be other devices, such as local computers. These local computers may be connected via wireless communication protocols, such as Wi-fi described above, or could make use of other technologies such as Li-fi which may allow data input via a camera on a user's smartphone 204 or smart glasses 202. The XR data may be stored in local access point devices connected to the peer-to-peer network, such as mobile telecommunication base stations or network-based storage devices. Such local access points may be capable of providing highly detailed, location-specific information. For example, an access point at a train station may provide localized, highly up-to-date information regarding train timetables, delays or cancellations, which could be displayed on the smart glasses 202 in an appropriate context specific manner. This localized data may then be transferred automatically to the device.

The functions described above in connection with FIGS. 3 to 6 could be performed by software applications. The software application may be installed on the smartphone 204 or the smart glasses 202. In other embodiments, the software may form part of the operating system of either or both of the smart glasses 202 or smartphone 204.

What is claimed is:

1. An extended-reality system for providing information to a user, the system comprising:
   a data determining unit configured to determine extended-reality data relating to locations within a distance of a location of the extended-reality system to be obtained based on a location and surrounding environment of the extended-reality system;
   a communication method determining unit configured to receive, from a third-party device that monitors a number of users in an area over at least one of days, months, and years to generate information identifying numbers of extended-reality systems in an area over different time periods, the generated information and determine a communication method for obtaining the extended-reality data based at least in part on the received information from the third-party device, wherein the extended-reality data may be obtained by one or more requests to a remote network-connected storage or by one or more requests to a local device outside of the extended-reality system via a peer-to-peer network, which local device has previously obtained the extended-reality data from the remote network-connected storage; and a communication unit configured to send a request to at least one of the local devices via the peer-to-peer network and the remote network-connected storage in dependence upon the determination by the communication method determining unit.

2. An extended-reality system according to claim 1, wherein the extended-reality system comprises a storage and a portion of the storage is allocated as a cache for extended-reality data, wherein extended reality data stored in the cache may be provided to one or more local devices participating in the peer-to-peer network.

3. An extended-reality system according to claim 2 wherein the extended-reality data stored in the storage includes a data field indicating a time at which the data needs to be refreshed from the remote network-connected storage.

4. An extended-reality system according to claim 1, wherein the extended-reality data includes information relating to the location of the user.

5. An extended-reality system according to claim 1, wherein the location of the user is determined using at least one of: a satellite navigation system or cellular network triangulation.

6. An extended-reality system according to claim 1, further comprising a camera for capturing images and a processor, wherein the processor is configured to process image data from the camera in order to determine a location of the extended reality system.

7. An extended-reality system according to claim 1, further comprising a network service discovery service configured to identify devices on the peer-to-peer network that can provide or access the extended-reality data determined by the data determining unit.

8. An extended-reality system according to claim 1, wherein the extended-reality system is configured to send a request to the local device including a request to access a network connection of the local device in order to obtain the extended-reality data.

9. An extended-reality system according to claim 1, wherein the extended-reality system is configured to receive settings from a user to control at least one of: a data amount transfer on a wireless connection that may be used on request by other devices on the peer-to-peer network, an amount of memory on the extended-reality system that may be used to store data for access by other devices on the peer-to-peer network, whether the device is tethered, a condition on the battery life of the extended-reality system that controls whether or not other devices on the peer-to-peer network may access data from the extended-reality system.

10. An extended-reality system according to claim 1, wherein the extended-reality system is configured to predict a movement of a wearer of the extended-reality system, wherein the data determining unit is configured to determine extended-reality data to be obtained based on the predicted movement of the wearer.

11. An extended-reality system according to claim 1, wherein the extended reality system is configured to obtain traffic information relating to movement patterns of users of extended-reality systems and wherein the data determining unit is configured to determine extended-reality data to be obtained based on the obtained traffic information.

12. An extended-reality system according to claim 1, wherein the extended-reality system is configured to receive a request for extended-reality data from a requesting device via the peer-to-peer network, the extended-reality system being configured to send extended-reality data to the requesting device in dependence upon at least one of:
   bandwidth of a connection available between the extended reality system and the requesting device over the peer-to-peer network;
   a battery level of the extended-reality system;
   a strength of a connection between the extended-reality system and the requesting device;
   a power consumption required to communicate with the requesting device over the peer-to-peer network; and
   a trust level of the requesting device.

13. An extended reality system according to claim 1, wherein the extended reality system is configured to:
   receive a request to obtain extended-reality data that is not present on the extended reality system from a requesting device on the peer-to-peer network; and
   obtain the extended-reality data from the remote network-connected storage on behalf of the requesting device in dependence upon at least one of:
   a rule relating to a quality of at least one of the connection between the extended-reality system and the remote network connected storage and the connection between the extended reality system and the requesting device over the peer-to-peer network;
   a battery level of the extended-reality system;
   a power consumption required to communicate with at least one of the requesting device and the remote network-connected storage;
   a latency involved in retrieving the requested extended-reality data;
   and a trust level of the requesting device.

14. An extended reality system according to claim 1 wherein the communication method determining unit is configured to request the extended-reality data to be obtained from the peer-to-peer network before sending a request to the remote network-connected storage.

15. An extended reality system according to claim 14, wherein the communication method determining unit is configured to send a request for extended-reality data to the remote network-connected storage if no response is received from the peer-to-peer network within a predetermined threshold time period.

16. An extended reality system according to claim 1, wherein the communication method determining unit is configured to request the extended-reality data to be obtained from the remote network-connected storage before sending a request over the peer-to-peer network.

17. A method for obtaining extended-reality data for an extended-reality system, the method comprising:
   determining extended-reality data relating to locations within a distance of a location of the extended reality system to be obtained based on a location and surrounding environment of the extended-reality system;
   receiving, from a third-party device that monitors a number of users in an area over at least one of days, months, and years to generate information identifying numbers of extended-reality systems in an area over different time periods, the generated information;

determining a communication method for obtaining the extended-reality data based at least in part on the received information, wherein the extended reality data may be obtained by one or more requests to the remote network-connected storage or by one or more requests to a local device outside of the extended-reality system via a peer-to-peer network, which local device has previously obtained the extended-reality data from the remote network-connected storage; and sending a request to at least one of the local device via the peer-to-peer network and the remote network-connected storage in dependence upon the determined communication method.

18. A non-transitory computer-readable storage medium storing instructions that, when executed by an extended-reality system, cause the extended-reality system to perform a method comprising:

determining extended-reality data relating to locations within a distance of a location of the extended reality system to be obtained based on a location and surrounding environment of the extended-reality system;

receiving, from a third-party device that monitors a number of users in an area over at least one of days, months, and years to generate information identifying numbers of extended-reality systems in an area over different time periods, the generated information;

determining a communication method for obtaining the extended-reality data based at least in part on the received information, wherein the extended reality data may be obtained by one or more requests to the remote network-connected storage or by one or more requests to a local device outside of the extended-reality system via a peer-to-peer network, which local device has previously obtained the extended-reality data from the remote network-connected storage; and sending a request to at least one of the local device via the peer-to-peer network and the remote network-connected storage in dependence upon the determined communication method.

* * * * *